3,424,705
PROCESS FOR THE PREPARATION OF POLYMER SOLUTIONS FROM POLYMER LATICES AND AGGLOMERATED LATICES THEREFROM

Gerardus E. La Heij and Jacques A. Waterman, Amsterdam, Netherlands, assignors to Shell Oil Company, New York, N.Y., a corporation of Delaware
No Drawing. Filed July 16, 1965, Ser. No. 472,662
Claims priority, application Netherlands, July 30, 1964, 6408700
U.S. Cl. 260—23.7          7 Claims
Int. Cl. C08f 47/00

ABSTRACT OF THE DISCLOSURE

A polymer cement is made by mixing an aqueous polymer latex with a solvent for the polymer at a temperature between the freezing point of water and the freezing point of the solvent, the solvent having the lower freezing point, and having a water solubility of less than 1% by weight and segregating the polymer cement thus formed from the water. A method is also provided for the preparation of an aqueous polymer latex having increased particle size from an aqueous latex by first forming a cement, as recited above, and then emulsifying the cement in water followed by vaporization of the solvent from the emulsion.

---

The invention relates to the preparation of solutions of polymers from their latices and to agglomerated latices prepared from such solutions. In this patent specification and the appertaining claims the term "polymers" is used to denote both homopolymers and copolymers. In particular, the invention relates to the preparation of pure solutions, that is, solutions containing no (or hardly any) electrolytes, dispersants or other auxiliary substances which are present in the latices, as a result of the manner in which these dispersions have been obtained or after-treated. Another aim of the invention is the separation of pure polymers from latices with the aid of solvents. The invention is of special importance for the preparation of solutions of polymers of dienes.

A customary method for the separation of polymers from latices is the one in which coagulation by addition of salt or acid is applied, as a result of which the above-mentioned auxiliary substances or other contaminants remain in the coagulate. Direct removal of the contaminants from the coagulate by extraction is often difficult or even entirely impractical. Such extraction is a laborious process and often requires special costly solvents. Moreover, dissolving polymers coagulated with chemicals is often a troublesome and time-consuming procedure. In consequence, the preparation of pure polymer solutions via coagulates obtained by chemical means, if not precluded, in many cases hold little attraction.

Now, in accordance with the invention a polymer solution can be prepared from a latex without using coagulants. Instead, the water of a polymer latex is frozen and liquid organic solvents are caused to act upon the polymer. Owing to the contact of the polymer with the solvent phase the polymer swells and/or dissolves. The swelling and dissolving of the polymer (as well as isolation) are facilitated by the water being frozen, since, in the absence of freezing a simple emulsion would be formed. The solvent phase may already be present during freezing and preferably the latex and the organic liquid are combined before freezing has started. However, it is also possible not to bring the latex into contact with the solvent until the latex water has been frozen.

Following intimate contact of the solvent and frozen latex, the solvent phase, now containing dissolved and/or swollen polymer, is separated from the aqueous phase. A special aspect of the present invention comprises the optional conversion of the resulting polymer solution to a latex having a low viscosity by emulsification of the solution with water and an emulsifying agent and vaporization of the solvent. The polymer solutions obtained according to the invention prove to contain no (or hardly any) contaminants or can be readily liberated from any remaining impurities by extraction.

The invention may be defined as relating to a process for the preparation of solutions of homo- and/or copolymers from latices of these polymers, characterized in that, in any order, the water of the latex is frozen and brought into contact with an organic liquid in which the polymer is soluble, an organic liquid being applied whose solubility in water at 20° C. is less than 1% w.

The action of the organic liquid upon the polymer is promoted if care is taken that during the contact of the frozen latex with the solvent the ice is in a dispersed state. This can be effected by fracturing an already frozen mass and suspending it in the organic liquid. Fracturing is preferably applied after the latex has been frozen in a thin layer, for example, on a rotating drum cooler. However, the most attractive manner to bring the ice into the dispersed state is to carry out freezing with the freezing mass being moved, for instance, stirring or shaking. As a result, the ice is formed in fine crystals. If, moreover, freezing takes place in the presence of the solvent, so that polymer passes into solution simultaneously, little or no polymer is enclosed in the ice. Good results are obtained with the application of turbomixers.

As a rule the latex and the organic liquid are preferably combined before or during freezing of the water. It is recommended to choose an organic liquid with a freezing point below 0° C. for dissolving the polymer and to cool this liquid to a temperature between 0° C. and the congealing point before it is combined with the latex. By means of this cold organic liquid the water phase is then frozen. However, it is also possible to bring the solvent into contact with the latex at room temperature and to proceed to cooling afterwards.

The degree of swelling (dissolving) is dependent not only on the nature of the polymer and the solvent, but also on the ratio of the quantity of solvent to the quantity of polymer on the temperature and on the duration of the contact between the solvent and the polymer. In any special case the ratio, temperature and duration of contact required can easily be determined experimentally. Preferably, the solvent is utilized in an amount between about 7.5 and 25 times the weight of the polymer. The solvent is maintained in intimate contact with the frozen latex for 0.5–6 hours prior to segregation of water from the polymer solution.

The isolation of the polymer solutions formed can be brought about in different ways. For example, the ice can be separated mechanically, for instance, by filtration or centrifugation.

However, the isolation of the polymer solutions preferably takes place by thawing the mixtures and causing them to segregate by gravity or centrifugation. After that, the water phase can easily be discharged. Obviously, thawing of the mixture requires heating. A suitable manner of heating is the addition of water, for example, of a temperature between 15° and 95° C. Furthermore, it is possible to thaw the cold mixture by means of the organic liquid. If the latex and the organic liquid are combined after the water has been frozen, thawing and dissolving of the polymer can take place simultaneously. If desired, freezing can also be effected by contact of the latex with cold organic liquid and subsequent thawing by the addition of organic liquid of a higher temperature.

The segregation proceeds more easily if the polymer particles have swollen to a maximum extent and/or have been dissolved. After an intimate contact of the organic liquid with the polymer and thawing, the segregation can as a rule take place spontaneously; that is, in a short time and merely by gravity. If necessary, the segregation can be facilitated and accelerated by centrifugation. A suitable device for this purpose is a decanting centrifuge or a hydrocyclone.

As a rule, the segregated mass consists of mixture of swollen polymer and polymer solution. Furthermore, this mixture may contain a small quantity of water and part of the auxiliary substances which have been used in the preparation or the after-treatment of the latex. These auxiliary substances comprise dispersants, stabilizers, remnants of polymerization catalysts, substances used to regulate the molecular weight of the polymers (modifiers), electrolytes, etc. For several applications of the polymer solutions the presence of one or more of these substances will be undesirable. Usually, it will be desirable to remove at least the water, the emulsifiers and the electrolytes from the polymer mass. The removal can best be carried out by first discharging the water phase as completely as possible and then extracting the remaining liquid organic layer containing the swollen and/or dissolved polymer mass.

In general, especially when ice is removed from the cold mixtures by mechanical means, very pure polymer solutions can be obtained when the polymer solutions formed are freed by extraction from the aforementioned auxiliary substances or other impurities before, during or after their isolation.

As these auxiliary substances are generally water-soluble, the extraction is preferably carried out with water, if desired, at raised temperature. However, it may be desirable to effect the extraction with alkaline aqueous solutions, for example, with a solution of an alkali metal hydroxide in water or aqueous ammonia. In this manner remnants of mercaptans can be extracted which are frequently used as molecular-weight regulators (modifiers) during the preparation of latices of diene polymers. It is recommended first to carry out an extraction with water, next one with an aqueous alkaline solution and finally another one with water.

In order to be certain that, for example, emulsifiers and electrolytes are extracted as completely as possible, the extraction is continued until these substances can no longer be identified in the extract phase. For instance, in a number of cases the extract phase can be tested for the presence of, for example, ionic emulsifiers by checking whether any turbidity occurs upon acidulating with concentrated sulfuric acid.

In order to obtain the extracted polymer solutions in the driest possible state, the raffinate phase is preferably freed from the last traces of water by the application of coalescence, distillation, freezing and/or treatment with an adsorbent.

Coalescence can be effected by bringing the polymer solution into contact with coalescing agents, such as polypropylene wool, steel wool, Raschig rings, powdered carbon, etc.

If necessary or desired, distillation can be carried out in vacuo. Whenever the solvent phases and extractants applied are suitable for this purpose, the distillation may be azeotropic.

Suitable adsorbents are, for instance, activated carbon, diatomaceous earth, filter aids, and, in particular, molecular sieves.

The following procedures are preferably applied successively: (a) coalescence, (b) freezing or distillation and (c) adsorption.

The polymers of which solutions are prepared by the process of the invention may be homo- and/or copolymers of compounds with one or more olefinically unsaturated compounds in the widest sense. Examples are homo- and copolymers of vinyl chloride, vinyl acetate, esters of acrylic acid and methacrylic acid, styrene, acrylonitrile, and, in particular, homo- and copolymers of conjugated dienes, for example, butadiene, isoprene, piperylene, cyclopentadiene or chloroprene. Among the copolymers of dienes, besides the copolymers of dienes among themselves and/or with vinyl aromatics, (e.g., styrene) the copolymers of dienes with unsaturated esters of mono- or polyvalent carboxylic acids should be specially mentioned. These esters should also be taken to include internal esters, frequently indicated by the name lactones.

Latices of synthetic polymers may contain unconverted monomer. This is mostly removed before the treatment according to the invention takes place. However, it is also possible to remove the monomer afterwards.

The average molecular weight of the polymers may vary within wide limits. A special category are the polymers whose intrinsic viscosity (IV), derived from viscosity measurements in solutions in toluene at 25° C., is lower than approximately 1 and whose average molecular weight is between 100 and 12,000, which polymers are often liquid or semisolid. Of special importance are solutions of homo- and/or copolymers of butadiene and/or chloroprene with these low molecular weights. As far as the homo- and/or copolymers of butadiene, isoprene and/or piperylene are concerned, (e.g., styrene-butadiene copolymers) the polymers with an average molecular weight between 12,000 and 1,000,000 are also important.

The process according to the invention is very attractive if the emulsifiers which are present in the latex readily dissolve in water and as a result can easily be removed by washing with water. For instance, this is the case with the water-soluble salts of saturated cycloaliphatic or of branched saturated noncyclic carboxylic acids. Very suitable representatives of this category of emulsifiers are the water-soluble salts of saturated cycloaliphatic or branched saturated non-cyclic carboxylic acids, which contain at least 8 and at most 40 carbon atoms per molecule and in which the carboxyl group is linked to tertiary and/or quaternary carbon atoms. Such carboxylic acids can be obtained by causing mono-olefins, preferably mono-olefins with between 10 and 20 carbon atoms in the molecule, or mixtures thereof, to react with formic acid or with carbon monoxide and water.

The liquid organic phase, that is the solvent phase, is preferably composed of hydrocarbons which may or may not be halogenated, which may be of an aliphatic, cycloaliphatic and/or aromatic nature. As very suitable representatives of the solvents, which has a freezing point below 0° C. may be mentioned, for instance, carbon disulfide, chloroform, carbon tetrachloride, 1,2-dichloro-ethane, toluene, aviation spirits, chlorocyclohexane, the cyclohexanes with one or more alkyl groups, for example, methylcyclohexane, ethylcyclohexane, 1,3-dimethylcyclohexane and 1,4-dimethylcyclohexane. These representatives may without objection be cooled to 10–60° C. below 0° C. and are especially suitable for dissolving styrene-butadiene rubbers.

Suitable boiling points or boiling ranges for the solvent phase are mainly between 35 and 250° C. Of special importance are the solvents whose viscosity is low, for instance, lower than 1 centipoise at 25° C. It has been found that even a slight decrease in viscosity may result in a considerable decrease in viscosity of the polymer solution. The presence of water-soluble organic liquids is undesirable, because they may often given rise to partial coagulation of the polymer.

In order to prepare concentrated polymer solutions the latex may be brought into contact with a liquid organic phase in which one or more polymers have been dissolved beforehand. More often than not the polymers dissolved beforehand and those present in the latex will be identical. For this purpose, for instance, a polymer solution is used which has been obtained according to the present process, in order to treat a new quantity of latex. However, it is also possible to apply a solvent phase in which an entirely different homo- and/or copolymer has been dissolved beforehand, for example, a polymer with a different chemical composition and/or a different molecular weight.

Depending on the nature of the polymer, the solvent applied and the polymer concentration, the solutions obtained according to the invention may be used for various purposes. For example, solutions of diene homo- and/or copolymers, in particular if these polymers have an average molecular weight between 100 and 12,000, can be applied as adhesive or as enamel and/or varnish, and in particular as can coating.

If one desires to modify the dissolved polymers, for example, in the case of diene polymer, the polymers in the solution obtained can be subjected to a chemical conversion. For instance, hydroxyl and/or carboxyl and/or ester groups may be formed in the polymer by blowing oxygen or air through the solutions, preferably via addition of metal driers (compounds of Co, Fe, Ni and Mn). The solutions modified in this manner are also suitable for use as enamel and/or varnish.

Furthermore, the solutions obtained according to the invention, whenever obtained with non-halogenated hydrocarbons as solvent, are extremely suitable for complete or partial hydrogenations in the liquid phase. Because of the purity of these solutions the hydrogenation may very well be carried out with catalysts of the Ziegler type. In polymer solutions prepared from polymer dispersions via coagulation with chemical agents, the catalysts of this type show a decrease in activity owing to the presence of emulsifiers, electrolytes and creaming agents.

The solutions which are subjected to a hydrogenation with catalysts of the Ziegler type are preferably freed from molecular oxygen before hand, for instance, by passing nitrogen through them. If desired, the process according to the invention may be carried out continuously.

Instead of utilizing the recovered polymer solutions as such, they may be converted to agglomerated latices by emulsification of the solution with water and vaporization of solvent. In this instance, by "agglomerated latex" is meant a latex in which the average particle size is larger than that in the original latex. Moreover, the particle size distribution, in conjunction with the larger average particle size, is such that the agglomerated latices have a lower viscosity at a given polymer concentration than in the original latex.

After the cold mixture of solution and water have been wholly or partly thawed, the polymer solution formed is emulsified in the water phase or in part thereof. As a rule, besides swollen polymer, polymer solution and water, the thawed mixture also contains auxiliary substances which have been used in the preparation or the after-treatment of the starting latex. These auxiliary substances comprise dispersants, stabilizers, remnants of polymerization catalysts, substances used to regulate the molecular weight of polymers (modifiers), electrolytes, etc. For several applications of the artificial latices the presence of one or more of these substances is undesirable. Usually, it will therefore be desirable to remove at least the electrolytes and in certain cases also the emulsifiers from the mixtures. The removal of the auxiliary substances which have been used in the preparation of the synthetic latex can best be carried out by causing the wholly or partly thawed mixtures to segregate by gravity or centrifugation before emulsifying, by discharging the water phase partly or as completely as possible and by then extracting the remaining organic phase which contains the swollen and/or dissolved polymer mass.

If the emulsification is carried out in part of the original water phase only, the latter can be mixed or made up with fresh water. This is done, for instance, when the emulsification is preceded by extraction of the organic phase with water.

To promote the emulsification an emulsifier can be added, if desired. This will be necessary, for instance, if extraction has been applied and as a result too small a quantity is left of the water-soluble emulsifier present originally. For the rest, the emulsifier to be added may or may not be identical with the dispersant present in the original latex. Suitable emulsifiers are alkali metal soaps of carboxylic acids having 8–40 carbon atoms per molecule. These include saturated and unsaturated fatty acids and polycyclic acids, e.g., the potassium soaps of oleic acid and of rosin acids.

Subsequent to emulsification, the organic solvent is vaporized by known means, such as flashing or steam stripping. Alternatively, if the emulsion tends to foam excessively during such operations, the entire mixture may be converted to a foam of shaving cream consistency and then cooled, whereup a latex and polymer-free solvent are liquified and can be readily separated by decanting or centrifuging.

Of the artificial latices obtained according to the invention, those which are prepared from synthetic styrene-butadiene latices are of special importance with a view to their application as foam-rubber latices. Because of their very low viscosities these artificial latices can be readily concentrated to solids contents of more than 70% by weight, and in the preparation of foam rubber from these latices the admixing of the vulcanization and other ingredients as well as whipping up to foam proceed smoothly and rapidly.

Example I

A number of experiments were carried out, in each of which 500 ml. of a styrene-butadiene-rubber latex was applied which had been prepared by emulsion copolymerization according to the S–1500–S recipe. The solids content of the latex was 19% w. The solvent was invariably methylcyclohexane of which quantities varying between 1000 and 2000 ml. were used. The latex and solvent were cooled in a cylindrical vessel with a capacity of 3 liters which had been provided with a turbomixer and a cooling jacket through which ethanol of between −20° C. and −10° C. was pumped around.

In part of the experiments (see experiments 1–4 in the table below) the latex and the solvent were cooled together with intensive stirring. In the other experiments (see table, experiments 5–7) the solvent was cooled first and the latex added to the cold methylcyclohexane with intensive stirring.

After about 15 minutes the latex was entirely frozen, the water phase having passed into fine ice crystals. While the low temperature was maintained stirring of the mixture was continued for three hours at a decreased speed of rotation. Subsequently, the mixture of ice and rubber solution was either filtered at a temperature below 0° C., or thawed by mixing with warm water or by external heating. After thawing by addition of warm water a rapid spontaneous segregation took place into a water layer and a liquid organic layer. When the mixture was thawed by external heating, segregation also took place without further aids, but this came about more slowly.

The manner of isolation, purification and drying of the organic layer was somewhat varied in each experiment. Further data as well as the results have been collected in the table below.

Example II

The bright colorless solution of styrene-butadiene rubber in methylcyclohexane, obtained in Experiment 5 of Example I, was diluted to a 2.6% w. solution with anhydrous methylcyclohexane. This solution was subjected to a hydrogenation, in which nickel-3,5-diisopropyl salicylate and aluminum triisobutyl were applied as catalyst-forming components. In the beginning of the hydrogenation, which was carried out at 40° C., the concentration of the nickel compound amounted to 0.5 mmole per liter, the concentration of the aluminum compound 2 mmole per liter. The catalyst-forming components had been mixed with each other beforehand for five minutes at 40° C. in a hundred-fold concentration. After two hours again an equal quantity of catalyst mixture prepared in the same manner was added. After 23 hours a further portion of catalyst mixture was added in the same manner. The total hydrogenation time amounted to 25 hours. The final product consisted of a solution of a polymer in which only two double bonds per 1000 carbon atoms were left and which had an intrinsic viscosity of 2.2.

Example III

The following substances were brought together in a double-walled glass reactor with a capacity of one liter: 200 pbv. of methylcyclohexane and 100 pbv. of a styrene-butadiene-rubber latex which had been obtained by emulsion polymerization at 5° C. according to the S–1500–S recipe and which contained 20% w. of styrene-butadiene copolymer (with a bound styrene content of 23.5% w. and an intrinsic viscosity of 2.0), as well as—calculated on polymer—7.0% w. of a mixture of Dresinate soaps and 0.75% w. of $Na_3PO_4$ .12 aq. The average particle size of the latex was 400–500 A.

The reactor contents were cooled externally with intensive stirring by means of a turbomixer, until the temperature of the mixture amounted to −20° C. The mixture was kept at this temperature for about three hours, stirring being continued at a moderate speed. During this treatment the water of the latex passed into fine ice crystals and the polymer dissolved in the methylcyclohexane.

The stirrer was then stopped and the temperature of the mixture raised to about 20° C. by external heating.

After the mixture had been thawed, a spontaneous segregation took place into a liquid organic layer consisting of polymer solution and a water layer which contained soap and sodium phosphate. After about two hours the phase separation was complete.

Subsequently, the two layers were emulsified by again causing the turbomixer to rotate at high speed. This resulted in an emulsion of which the discontinuous phase consisted of polymer solution and the continuous phase of electrolyte-containing water.

Next, the methylcyclohexane was removed from the emulsion by stripping with steam, resulting in an artificial styrene-butadiene-rubber latex which contained about 3% w. of polymer. This latex was concentrated to a solids content of approximately 60% w. with the aid of a supercentrifuge operating continuously.

The average particle size of the artificial latex was 4000 A. The concentrated artificial latex had a viscosity of 52 cp. (at 25° C. and a shear rate of 207.8 sec$^{-1}$) a surface tension of 30 dynes/cm. and a pH of 9.8.

For the sake of comparison the table below gives the values for the viscosities of a number of styrene-butadiene-rubber latices, all of which had a solids content of 60% w., but which had been obtained in different manners. From this table it follows that the artificial latex prepared according to the present example had the most favorable viscosity.

TABLE I

| Exp. No. | Quantity of methyl-cyclo-hexane, ml. | Freezing Conditions Temp., °C. | Time, hr. | Removal of water From Mixture of Solution and Ice | Extraction of Resulting Solution | Removal of Water From Extracted Solution | Removal of Traces of Water | Polymer Concentration, Percent w. | Final Solution Appearance | Viscosity at 25° C and Shear Rate of 111.2 s$^{-1}$ cp. |
|---|---|---|---|---|---|---|---|---|---|---|
| 1 | 2,000 | −10/−20 | 2–3 | Direct filtration ice crystals at temperature below 0° C. The ice particles removed still contained polymer solution. | None | None | Molecular sieves | 5.8 | Bright pale yellow | 34.2 |
| 2 | 2,000 | −20 | 2–3 | Thawing by pouring into 2,500 ml. warm water (50–60° C.), followed by spontaneous rapid segregation after which discharge of water layer. | Twice with dist. water of 50–60° C | Freezing, followed by filtration through 0.5% w. filter aid at temp. below 0° C. | do | 5.1 | Almost bright; colorless | 27.0 |
| 3 | 2,000 | −20 | 2–3 | do | do | With the aid of $CaCl_2$ | do | 4.8 | do | 20.4 |
| 4 | 2,000 | −20 | 2–3 | do | do | Freezing, followed by filtration through 0.5% w. filter aid [2] at below 0° C. | do | 5.5 | Bright; pale yellow | 42.5 |
| 5 | 1,000 | −20 | 3 | Thawing by external heating, followed by segregation, after which discharge of water layer. | Twice with distilled water of 70° C | Freezing to −20° C. followed by filtration through 0.5% w. filter aid [2] at −20° C. | do | 10 | Bright; colorless | 390 |
| 6 | 1,000 | −20 | 3 | Thawing with 1,000 ml. warm water (70° C.), followed by spontaneous rapid segregation after which discharge of water layer. | do | Distilled off under nitrogen at 60–80° C. and 15 cm. Hg. | do | 10 | Almost bright; colorless | 90 |
| 7 | 1,000 | −20 | 3 | do | do | Coalescence over polypropene wool (1 denier, avg. diam. 35 microns), then distilled off as in Exp. 6. | | 10 | Bright; colorless | 390 |

[1] Latex was added after the methylcyclohexane had been cooled to −20° C. [2] Diatomaceous earth.

| Mode of preparation of the 60% w. latex | Viscosity at 25° C. and a shear rate of 207.8 sec.$^{-1}$, cp |
|---|---|
| S-2105-recipe, direct | 94 |
| Successively S-1500-S recipe, freezing agglomeration, centrifugation | 91 |
| Successively S-1500-S recipe, agglomeration by treatment with benzene, concentration by evaporation | 70 |
| Successively S-1500-S recipe, treatment as indicated in the present example | 52 |

Example IV

In otherwise the same manner as described in Example III, 100 pbv. of the synthetic starting latex described in Example III, after having been cooled to 0° C., was added with rapid stirring by a turbomixer to 200 pbv. of methylcyclohexane, which had been cooled to —20° C.

The resultant mixture of ice, polymer and solvent was kept at —20° C. for 2 hours without stirring, after which the temperature was raised to 50° C. by external heating. This caused a spontaneous segregation into two layers, which phase separation was already complete after half an hour. The upper layer consisted of a solution of the polymer in methylcyclohexane, the bottom layer of water in which the soap and a slight quantity of electrolyte had been dissolved. The two layers were then emulsified by again putting the turbomixer into operation, after which the solvent was removed by stripping with steam.

The artificial latex obtained in this manner, whose solids content amounted to approximately 5% w., was concentrated to a solids content of about 63% w. by evaporation of the water. The average particle size was 3500 A. and the viscosity 35 cp. at 25° C. and a shear rate of 111.2 sec$^{-1}$.

Example V

With rapid stirring by a turbomixer, 100 pbv. of a foam rubber latex with a solids content of 60% w., and of which the polymer was a styrene-butadiene-copolymer with a bound styrene content of 23.0% w., was cooled down to —5° C. The latex had been prepared according to the S-2105 recipe and contained 7% w. of soap—calculated on polymer—consisting of a mixture of potassium oleate and sodium soap of disproportionated rosin. The average particle size of this latex was approximately 2000 A.

To the cooled mass consisting of ice and polymer 600 pbv. of methylcyclohexane, which had also been cooled to —5° C., was added with moderate stirring. After intensive mixing, stirring was stopped and the mixture kept at —5° C. for another four hours.

Subsequently, the temperature was raised by 20° C. by external heating, whereby a separation into two liquid layers was obtained. These layers were emulsified with the aid of the turbomixer, after which the methylcyclohexane was removed from the emulsion by stripping with steam.

The remaining artificial styrene-butadiene-rubber latex, whose solids content amounted to about 8% w., was concentrated to a solids content of 70% w. in a super-centrifuge. The latex thus obtained had an average particle size of 5000 A. and a very low viscosity. The viscosity measured at 25° C. and a shear rate of 111.2 sec$^{-1}$ amounted to 32 cp. The soap content, calculated on polymer, was as low as 2% w.

Example VI

In the manner described in Example III, 100 pbv. of a styrene-butadiene-rubber latex prepared according to the S-1500-S recipe and having a copolymer content of about 35% w. and an average particle size of about 600 A. was combined with 500 pbv. of methylcyclohexane. The contents of soap and electrolyte (sodium phosphate)—calculated on polymer—were the same as in the starting latex described in Example III.

The mixture was cooled to —5° C. with intensive stirring by a turbomixer, after which stirring was stopped and the reactor contents were kept at this temperature for about five hours.

Cooling was then terminated and the mixture thawed by the addition of 100 pbv. of water of 90° C.

After all the ice had melted, a spontaneous rapid segregation into two liquid layers took place. The upper layer consisted of a solution of the copolymer in methylcyclohexane, the bottom layer of water, in which the soap and electrolyte had been dissolved.

Subsequently, 100 pbv. of the aqueous bottom layer was discharged, 1% w. (calculated on polymer) of potassium oleate was added and the organic layer emulsified in the remaining aqueous bottom layer. Emulsification took place with the aid of a colloid mill. After the emulsification the methylcyclohexane was removed by azeotropic distillation in vacuo, part of the condensed water being recycled to the distillation vessel.

The artificial latex thus obtained contained approximately 12% w. of copolymer, 1.0% w. of soap and 0.08% w. of electrolyte.

This latex was concentrated to a solids content of 66% w. with the aid of a super-centrifuge.

The soap content of the concentrated latex—calculated on polymer—amounted to 1.4% w. At 25° C. and a shear rate of 111.2 sec$^{-1}$ a viscosity of 29 cp. was measured. The average particle size was 54,000 A.

Example VII

With intensive stirring by a turbomixer, 15 pbv. of a 20% w. styrene-butadiene-rubber latex, which had been prepared at 5° C. according to the S-1500-S recipe and whose average particle size amounted to 400–500 A., was added to 100 pbv. of a 3% w. solution of polyisoprene (intrinsic viscosity = 7) in methylcyclohexane, which solution had been cooled to —20° C.

The mixture was kept at a temperature of —20° C. for about 2.5 hours with moderate stirring. Then the stirrer was stopped and the temperature of the mixture raised to +20° C. by the addition of 80 pbv. of water of 70° C., in which—calculated on rubber—2% w. of potassium oleate had been dissolved. After segregation into two liquid layers had taken place, the organic layer was emulsified in the water phase with the aid of the turbomixer and next the solvent removed from the emulsion thus obtained by stripping with steam. The resulting latex had a solids content of 4%w., and the average particle size of the solid material was 4000 A.

By concentration in a super-centrifuge an artificial polyisoprene containing styrene-butadiene-rubber latex was obtained, which contained 67% w. of solid material. The soap content, calculated on polymer, amounted to 2% w. The surface tension of this latex was 30 dynes/cm. and the viscosity, measured at 25° C. and a shear rate of 111.2 sec$^{-1}$, amounted to 28 cp.

We claim as our invention:

1. The method for the preparation of a polymer cement which comprises:
   (a) admixing an aqueous polymer latex with a solvent for the polymer, the temperature of the mixture so formed being between the freezing point of water and the freezing point of the solvent; the solvent having a freezing point lower than that of water, having a water solubility of less than 1% by weight at 20° C. and being present in an amount sufficient to form a solution with all of the polymer;
   (b) and segregating the solvent and polymer from the water; whereby a solution of polymer in the solvent is obtained.

2. A method according to claim 1 wherein segregation comprises filtration of frozen aqueous phase from polymer solution.

3. A method according to claim 1 wherein segregation comprises thawing the frozen aqueous phase, whereby a liquid aqueous phase and a liquid polymer cement phase are formed, and separating the two phases.

4. A method according to claim 1 wherein the polymer latex is a styrene-butadiene polymerization latex containing 5–30% by weight of polymer and the solvent is a hydrocarbon present in an amount between 7.5 and 25 times the weight of the polymer.

5. A method according to claim 1 wherein the aqueous phase is maintained in a frozen state for 0.5–6 hours prior to segregation.

6. A latex obtained by the method which comprises:
  (a) emulsifying a polymer cement, obtained in accordance with the process of claim 1, with water containing an emulsifying agent, the amount of water and agent being sufficient to form an oil-in-water emulsion with cement;
  (b) and thereafter vaporizing the solvent from the emulsion, whereby a latex is formed which has an average particle size larger than that of the latex utilized in the cement-forming steps of the process of claim 1.

7. A latex according to claim 6 wherein the emulsifier is an alkali metal soap of a mono-carboxylic acid present in amount between about 0.5 and 5% by weight based on the polymer and polymer in the emulsion is between about 1% and 15% by weight based on water.

References Cited

UNITED STATES PATENTS

| | | | |
|---|---|---|---|
| 3,214,401 | 10/1965 | McKenzie et al. | 260—29.6 |
| 3,236,800 | 2/1966 | Waterman et al. | 260—29.7 |
| 3,250,737 | 5/1966 | Halper et al. | 260—29.7 |
| 3,284,396 | 11/1966 | Talalay | 260—29.7 |
| 3,285,869 | 11/1966 | Ronay et al. | 260—23.7 |
| 3,215,649 | 11/1965 | Preiss et al. | 260—2.5 |
| 3,258,440 | 6/1966 | Burleigh et al. | 260—23.7 |
| 3,301,810 | 1/1967 | Hunter et al. | 260—29.7 |
| 3,305,508 | 2/1967 | La Heij et al. | 260—29.7 |

DONALD E. CZAJA, *Primary Examiner.*

R. A. WHITE, *Assistant Examiner.*

U.S. Cl. X.R.

260—23, 27, 29.6, 29.7, 33.6, 34.2